Feb. 2, 1965 R. C. JOSCHKO 3,168,292
BEVERAGE MIXING DEVICE
Filed Dec. 18, 1961 2 Sheets-Sheet 1

INVENTOR.
RAYMOND C. JOSCHKO
BY
Meyers & Peterson
ATTORNEYS

Feb. 2, 1965 R. C. JOSCHKO 3,168,292
BEVERAGE MIXING DEVICE
Filed Dec. 18, 1961 2 Sheets-Sheet 2

INVENTOR.
RAYMOND C. JOSCHKO
BY
Meyers & Peterson
ATTORNEYS

United States Patent Office 3,168,292
Patented Feb. 2, 1965

3,168,292
BEVERAGE MIXING DEVICE
Raymond C. Joschko, Minneapolis, Minn., assignor to Vendomatic Sales, Inc., Minneapolis, Minn., a corporation of Minnesota
Filed Dec. 18, 1961, Ser. No. 160,144
6 Claims. (Cl. 259—9)

This invention relates generally to the making and vending of beverages, and pertains more particularly to a beverage mixing device for vending machines and dispensers.

One object of the present invention is to provide a mixing device for vending and dispensing machines, hereinafter generally called vending machines, that will be very effective as to its mixing action. In this regard, it can be pointed out that vending machines have become quite popular in which the various ingredients constituting the beverage are mixed at the time the machine is called upon to dispense the beverage. In other words, the beverage is not premixed, thereby providing in the instant case a greater variety of ingredients that can be selected and at the same time providing a freshly prepared drink that will possess good taste qualities. Because of the "on-the-spot" mixing of ingredients, the need arises for a mixer that will be very efficient in making certain that all of the ingredients that are to be blended together are completely intermixed.

Another object of the invention is to provide a beverage mixing device for vending machines that will be substantially splash-free in its operation. It can be appreciated that beverages must be mixed quite rapidly, and the present invention has for an aim the prevention of any splashing that would produce a loss of beverage and also require maintenance attention.

A further object is to provide a mixing device for beverages that can be quickly removed from the machine should circumstances so dictate.

Still another object of the invention is to provide a mixing apparatus that can be easily cleaned.

Still further, it is within the contemplation of the invention to provide mixing apparatus that is simple, inexpensive to manufacture, long lasting, and which will require little or no repairs.

These and other objects and advantages of this invention will more fully appear from the following description, made in connection with the accompanying drawings, wherein like reference characters refer to the same or similar parts throughout the several views and in which.

Figure 1:
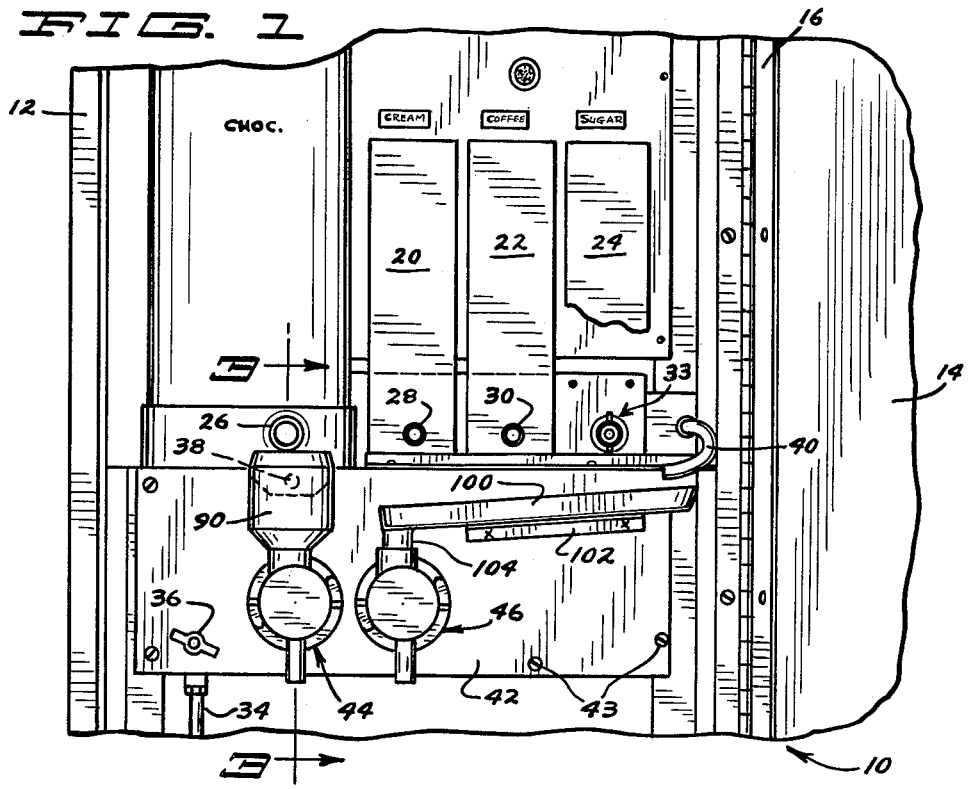
FIGURE 1 is a fragmentary elevational view of an automatic vending machine equipped with two of my beverage mixing devices, the front door being swung into an open position in order to show the two mixing devices.
Figure 2:
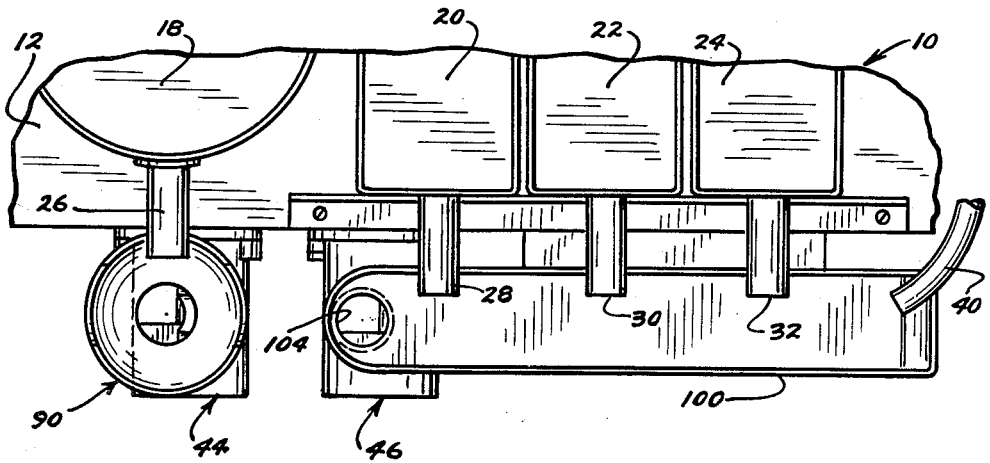
FIGURE 2 is a top plan view corresponding to FIGURE 1.

Referring first in detail to FIGURES 1 and 2, it will be observed that the automatic vending machine with which my invention is associated has been designated generally by the reference numeral 10. The machine includes a housing 12 provided with a door 14 which is hinged at 16. The door 14 is depicted in an open relationship with the housing 12 so as to show to good advantage the various parts contained within the housing 12.

Although my invention is capable of use with automatic vending machines of various constructions, it will be assumed for the sake of discussion that various dry ingredients are stored in containers denoted by the reference numerals 18, 20, 22 and 24. For instance, the container 18 may be considered to store chocolate, the container 20 to house powdered cream, the container 22 to store instant coffee of the powdered variety, and the container 24 to contain granulated sugar. The stored contents of the various containers 18–24 are discharged via a spout on each container, these various spouts having been given reference numerals 26, 28, 30, and 32, respectively. It will be appreciated that the ingredients that exit through these spouts 26–32 are metered so that the various proportions will be proper. Inasmuch as the specific type of metering mechanism is not important to an understanding of the present invention, a typical mechanism has been only generally illustrated at 33, the lower portion of the container 24 having been removed to expose the mechanism. The depicted mechanism is in the form of an auger that dispenses the proper amount of ingredient in each situation. Should additional information be desired with respect to a particular auger mechanism that can be employed, reference may be had to my copending application titled "Apparatus for Mixing Powdered Base and Liquid to Provide a Beverage," Serial Number 738,744, filed May 29, 1958, now Patent No. 3,013,701.

Inasmuch as the ingredients are to be mixed at the time the person desiring a beverage operates the machine, a hot water line labeled 34 has been pictured, this line having a shut-off valve 36 therein. After the valve 36 are two individual lines terminating in discharge ends 38, 40. It will be understood that appropriate valve mechanisms are included in circuit with the ends 38, 40 so that only the proper amount of water is dispensed for a given drink that is ordered. Such mechanisms are quite conventional and are not herein shown.

A panel member 42 is suitably attached to portions of the housing 12, more specifically its frame, as by screws 43. As will be better understood hereinafter, the panel member 42 functions as a mounting means for parts later referred to.

For the purpose of illustrating the versatility of my invention, two beverage mixing devices 44, 46 have been pictured. These devices are of identical construction and for the most part can be of plastic material, such as polyethylene. Each device comprises a cylindrical casing 48 having a closed end 50. The casing in each instance has a tubular inlet 52 which is offset from the axis of the casing 48, the tubular inlet extending upwardly in a generally tangential direction as best seen from FIGURE 4. A tubular outlet 54 is centrally located at the bottom of each casing 48, the outlet extending downwardly in a generally radial direction. Also, as best seen from FIGURE 4, the casing 48 is formed with radially projecting bayonets or ears 56. As will presently be made manifest, these bayonets or ears 56 cooperate in the mounting of the cylindrical casing 48.

At this time, attention is directed to a bearing and closure means 58. The bearings and closure means 58 includes an integral flange 60 having a plurality of apertures therein so that the casing 48 can be retained in a fixed relationship with the panel member 42. The means 58 additionally includes a bushing 64 having an outside diameter such that it snugly fits within the end of the cylindrical casing 48 lying opposite the closed end 50 thereof. Thus, the bushing 64 serves to close what is otherwise an open end of the casing 48. Concentrically disposed relative to the bushing 64 is an internally threaded collar 66. Disposed at one end of the collar 66 is a resilient packing ring 68 having one end of a packing nut 70 bearing thereagainst. Cooperable with the bayonets or ears 56 are fingers 72 which are integrally carried on the flange 60. The fingers 72 form slots that receive the bayonets 56 when the casing 48 is twisted about its longitudinal axis.

Figure 3:
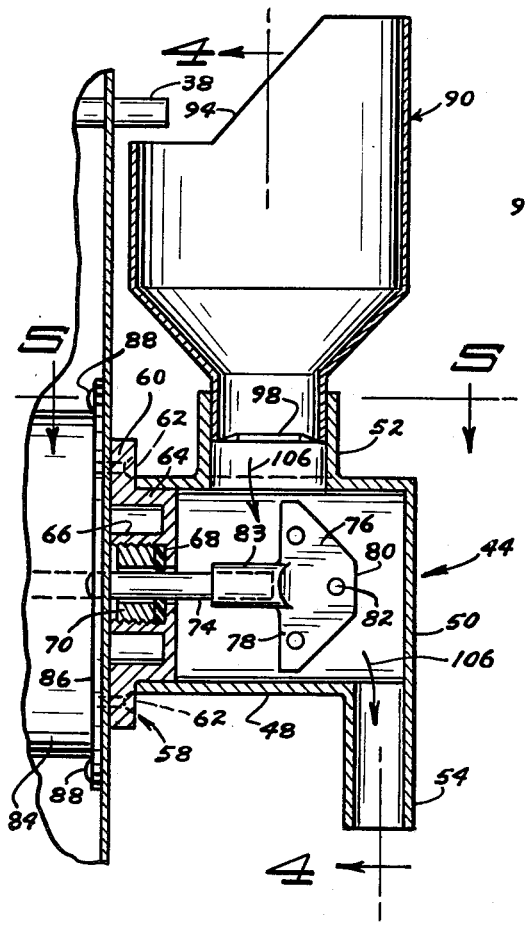
FIGURE 3 is a vertical sectional view through one of the mixing devices taken in the direction of line 3—3 of FIGURE 1.

A shaft 74 extends through the bearing and closure means 58, one projecting end being within the cylindrical casing 48 and the other passing through the panel member 42. From FIGURE 3 it will be discerned that by tightening the packing nut 70 against the packing ring 68, the sealing action of the bearing and closure means 58 with respect to the shaft 74 is governed.

Carried on the end of the shaft 74 which projects into the casing 48 is an impeller blade 76. This blade is generally flat, the plane thereof passing through the axis of rotation of the shaft 74. However, from FIGURE 3 it will be noted that the edge labeled 78 which is nearer the inlet 52 has a radius only slightly less than that of the bore of the cylindrical casing 48, whereas the edge denoted by the numeral 80 is of considerably smaller radius, the edge 80 lying nearer the outlet 54. The blade 76 is formed with a plurality of apertures 82 for the purpose of enhancing the mixing action. Also, it is to be observed that the blade 76 is formed with an integral socket 83 that is press-fitted over the end of the shaft 74.

The shaft 74 is driven by an electric motor 84 having a casing provided with a flange 86 by which the motor can be affixed to the side of the panel member 42 lying opposite the side to which the flange 60 of the bearing and closure means 58 is attached. Mounting screws 88 serve as the attaching means for the flange 86.

Associated with the mixing device 44 is a funnel 90 having an enlarged upper end 92 formed with a cut-away portion at 94 for the purpose of accommodating the discharge end 38 of the hot water line 34. The funnel 90 also has a reduced diameter lower end labeled 96, this reduced lower end fitting within the tubular inlet 52. It is of importance to observe that the lower end 96 is equipped with a deflector 98. The deflector 98 is located at the side of the lower end 96 which is more nearly above the axis of rotation of the shaft 74. Thus, the deflector 98 cooperates in guiding the ingredients through the tubular inlet 52 in a substantially tangential direction. The importance of this will be better appreciated from the operational description hereinafter presented.

Unlike the mixing device 44, the device 46 has associated with it a trough 100 that rests on an angle support 102 that can be secured to the panel 42, as by welding. The trough 100 is of generally rectangular cross section, but has at its lower end a downwardly extending tubular discharge member 104. The tubular discharge 104 corresponds to the reduced end 96 on the funnel 90.

Thus, whereas the spout 26 and the discharge end 38 deliver their ingredients into the funnel 90, the various spouts 28, 30 and 32, as well as discharge end 40, feed into the trough 100.

Having presented the foregoing information, the manner in which my beverage mixing device operates should be readily understood. However, a brief description will be of help in appreciating the benefits to be derived from a practicing of the instant invention. It has already been mentioned that the tubular inlet 52 assumes a tangential configuration with respect to the cylindrical casing 48. From FIGURE 4 it will be seen that the impeller blade 76 has a rotation in the direction of the arrow 106. The motor 84, of course, is responsible for accomplishing this rotative direction via the shaft 74. Additional arrows 106 denote the path taken by the ingredients.

Consequently, should one order hot chocolate, powdered chocolate from the container 18 will be delivered into the funnel 90 via the spout 26. It has already been pointed out that a suitable metering mechanism would be utilized for measuring out the proper quantity of this ingredient. At the same time, water is discharged through the end 38 into the funnel 90. Owing to the rotation of the impeller blade 76 within its cylindrical casing 48, it will be seen that the two ingredients are mixed together. As can be discerned from inspection of FIGURE 3, the tubular outlet 54 is displaced in a longitudinal direction from the tubular inlet 52. Thus, the ingredients when traversing the path indicated by the arrows 106 will be subjected to a thorough mixing action. The various apertures 82 assist in producing a good blending of the ingredients.

Of considerable importance is the fact that splashing during the mixing operation is for all intents and purposes obviated. This comes about from the fact that the inlet 52 is offset with respect to the axis about which the impeller blade 76 rotates. By reason of the direction of rotation, as indicated by the arrow 106 in FIGURE 4, the impeller blade 76 is moving downwardly as it passes beneath the inlet. Hence, there is no movement of the blade 76 in a direction that would force any of the ingredients being mixed together in an upwardly directed path. Even greater assurance that there will be no splashing is derived from the presence of the deflector 98 which makes certain that the ingredients do enter the inlet 52 more in an offset relationship than would be derived if there were no deflector 98.

Due to the difference in radial length of the edges 78 and 80 on the impeller blade 76, it will be appreciated that the major portion of the mixing action is achieved immediately after entrance of the ingredients into the casing 48. The angular configuration formed by reason of the difference in radial length that has been noted above provides a progressively less churning action as the ingredients move through the casing 48. Hence, when the ingredients have reached the region immediately above the outlet 54, their flow is quite smooth. Therefore, when the mixed or blended beverage is discharged via the outlet 54, it emerges in a relatively non-pulsating fashion.

For the operation of the mixing device 46, it can be appreciated that this mixing action is the same as within the device 44. However, more ingredients are involved in the illustrated situation. In this regard, it will be seen that at times four ingredients will flow into the trough 100 and will enter the device 46 through its particular inlet 52. More specifically, it is contemplated that coffee, cream, sugar, and water all be mixed at times in the device 46. Here again, the flow of these ingredients downwardly through the trough 100 is quickly achieved and by virtue of the construction of the device 46 no splash-back is experienced.

Figure 4:
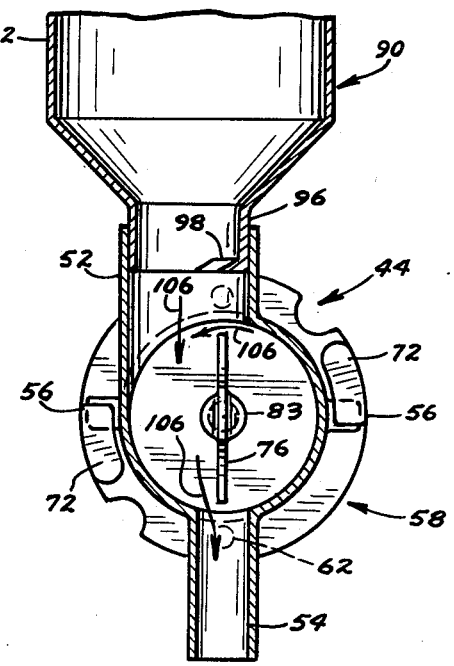
FIGURE 4 is a front sectional view, the view being taken generally in the direction of line 4—4 of FIGURE 3.
Figure 5:
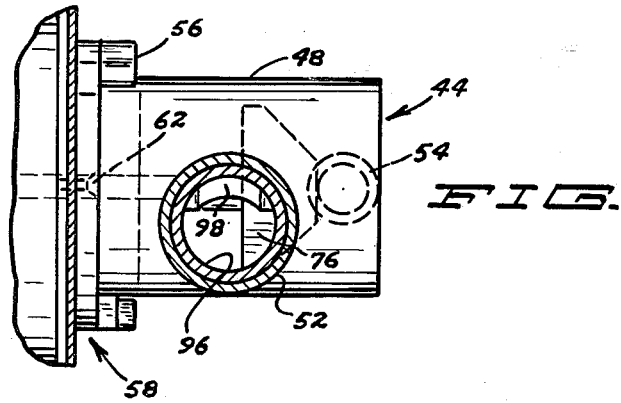
FIGURE 5 is a horizontal sectional view taken in the direction of line 5—5 of FIGURE 3.

Should either device 44 or 46 require removal, the casing 48 can be twisted in a clockwise direction as viewed in FIGURE 4 and the impeller blade 76 will thereby be exposed. This facilitates both the cleaning and the replacement of any parts.

It will, of course, be understood that various changes may be made in the form, details, arrangements and proportions of the parts without departing from the scope of this invention as set forth in the appended claims.

What is claimed:

1. A beverage mixing device for vending machines comprising a horizontal cylindrical casing having an inlet and a longitudinally offset outlet, and a generally flat impeller blade mounted for rotation about a horizontal axis within said casing, said impeller having angled edges inclining inwardly toward said axis of rotation adjacent said outlet to provide a straight edge of appreciably lesser transverse length in the region of said outlet as compared with the length of the edge of the impeller blade in the region of said inlet.

2. A beverage mixing device in accordance with claim 1 in which said impeller blade is formed with a plurality of apertures, there being a greater number of apertures adjacent the edge of said blade nearer said inlet than the edge thereof nearer said outlet.

3. A beverage mixing device in accordance with claim 2 in which said plurality of apertures constitutes three apertures, one aperture residing in each side of said axis of rotation which are located adjacent the edge nearer said inlet and the third of said apertures residing on said axis of rotation adjacent the edge of said blade nearer said outlet.

4. A beverage mixing device for vending machines comprising a horizontal cylindrical casing having an offset inlet extending upwardly in a generally tangential direction and an outlet extending downwardly in a generally radial direction, said inlet and outlet being displaced axially with respect to each other, and an impeller blade within said cylindrical casing having a portion thereof underlying said inlet and mounted for rotation in a direction such that said blade is moving downwardly when passing beneath said inlet, said impeller blade being substantially flat and residing in a plane extending through its axis of rotation and said blade having a radial length at the edge thereof nearer said inlet which is slightly less than the internal radius of said casing and a much shorter radial length at the edge thereof nearer said outlet.

5. A beverage mixing device in accordance with claim 4 in which said blade is formed with a plurality of apertures.

6. A beverage mixing device for vending machines comprising a horizontal cylindrical casing having an inlet and a longitudinally offset outlet, and a generally flat impeller blade mounted for rotation about a horizontal axis within said casing, said impeller having edges tapering inwardly toward said axis of rotation adjacent said outlet to provide a straight edge of appreciably lesser transverse length in the region of said outlet as compared with the length of the edge of the impeller blade in the region of said inlet.

References Cited by the Examiner
UNITED STATES PATENTS

| 1,267,241 | 5/18 | McCaughey | 259—45 X |
| 2,369,282 | 2/45 | Curtis et al. | 222—333 |
| 2,705,131 | 3/55 | Ross et al. | 259—25 |
| 2,839,277 | 6/58 | Rishoi et al. | 259—9 |
| 2,863,649 | 12/58 | Grubb et al. | 259—9 |
| 3,012,763 | 12/61 | Martin | 259—9 X |

WALTER A. SCHEEL, *Primary Examiner.*